United States Patent

Chambers

[11] 3,824,847
[45] July 23, 1974

[54] AUTOMOTIVE BRAKE TESTER ASSEMBLY
[76] Inventor: Marshall R. Chambers, 2271 Golfview, Troy, Mich. 48084
[22] Filed: Aug. 3, 1972
[21] Appl. No.: 277,725

[52] U.S. Cl. ................................................ 73/132
[51] Int. Cl. ............................................ G01l 5/22
[58] Field of Search ...................... 73/132, 141 AB

[56] References Cited
UNITED STATES PATENTS
3,602,093  8/1971  Markey .............................. 73/132

Primary Examiner—Jerry W. Myracle
Attorney, Agent, or Firm—McGlynn and Milton

[57] ABSTRACT

An automotive brake tester assembly including a housing with a force applying pedal attached thereto. A brake pedal contact member is slidably disposed in and extends from the housing. A floor board contact member is slidably disposed in and extends from the housing. Scales are disposed on a plate attached to the housing with the first scale indicating the amount of brake pedal travel and the second scale indicating the ratio of the distance between the pedal and floor board when the pedal is fully depressed and the distance between the brake pedal and the floor board when the brake pedal is in the non-depressed position. A first indicator means is connected to the pedal contact member and is movable along the first scale and a second indicator means is connected to the floor board contact member and is movable along the second scale. There is also included a flag connected to the pedal contact member and movable out through an opening in the housing when a predetermined force is being applied to a brake pedal, the predetermined force resulting from depression of a spring which reacts between the pedal contact member and the housing to urge the pedal contact member out of the housing.

20 Claims, 5 Drawing Figures

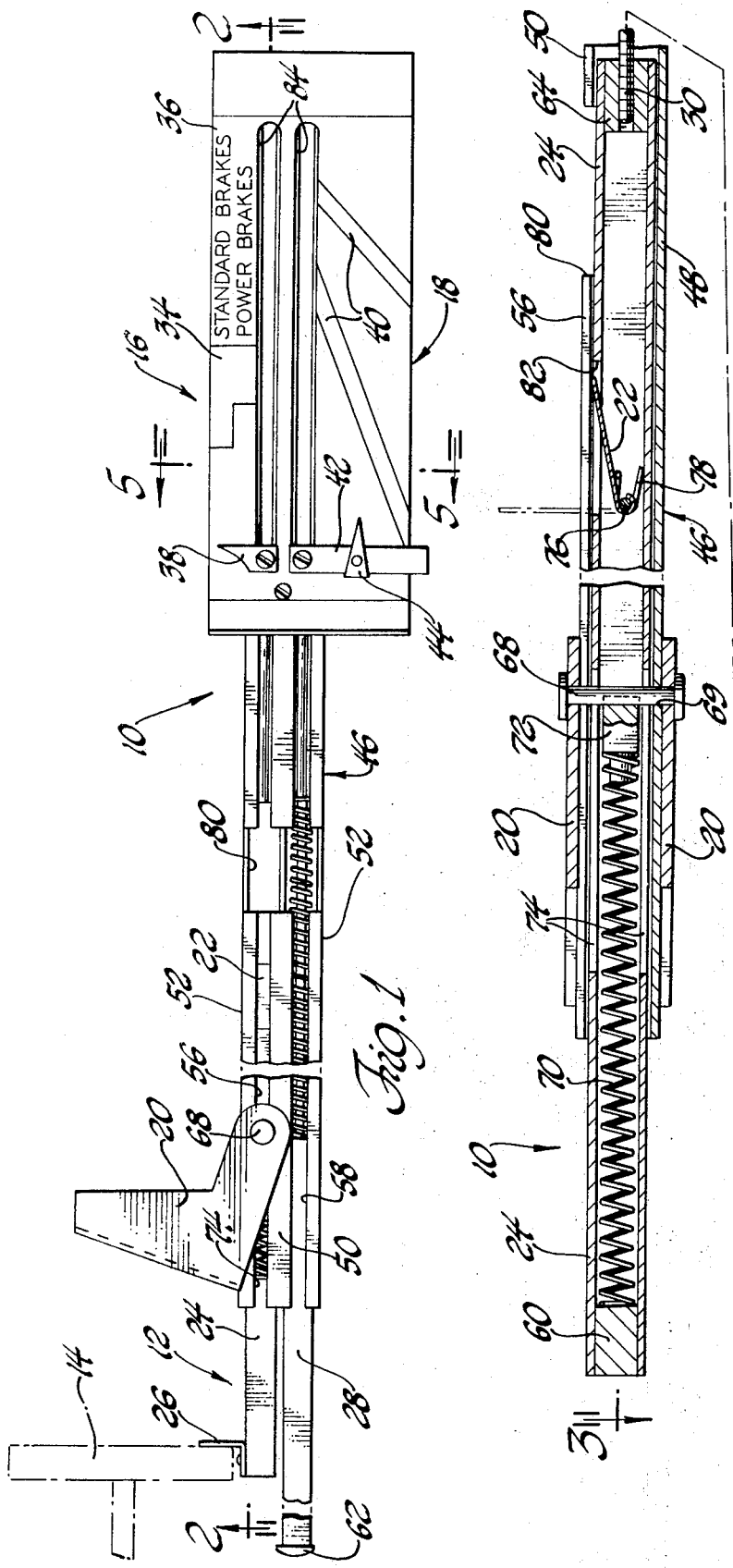

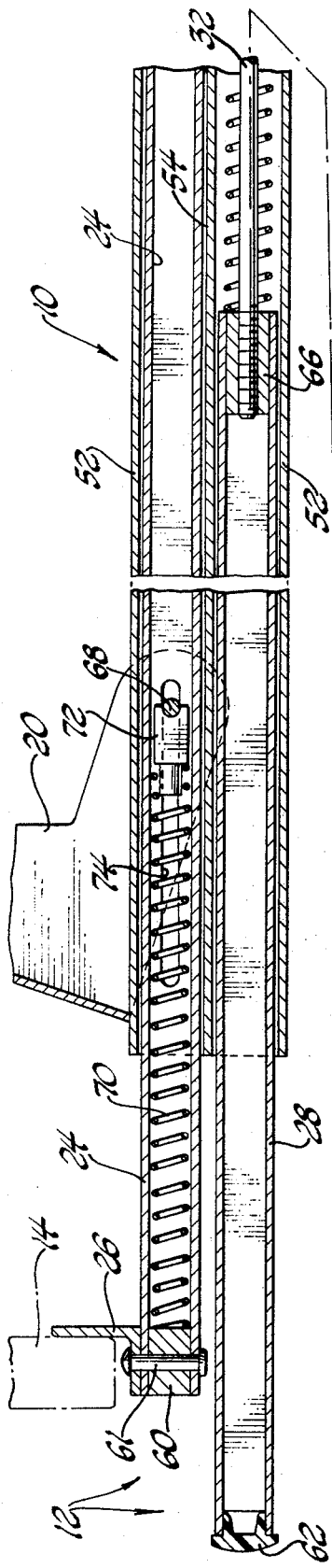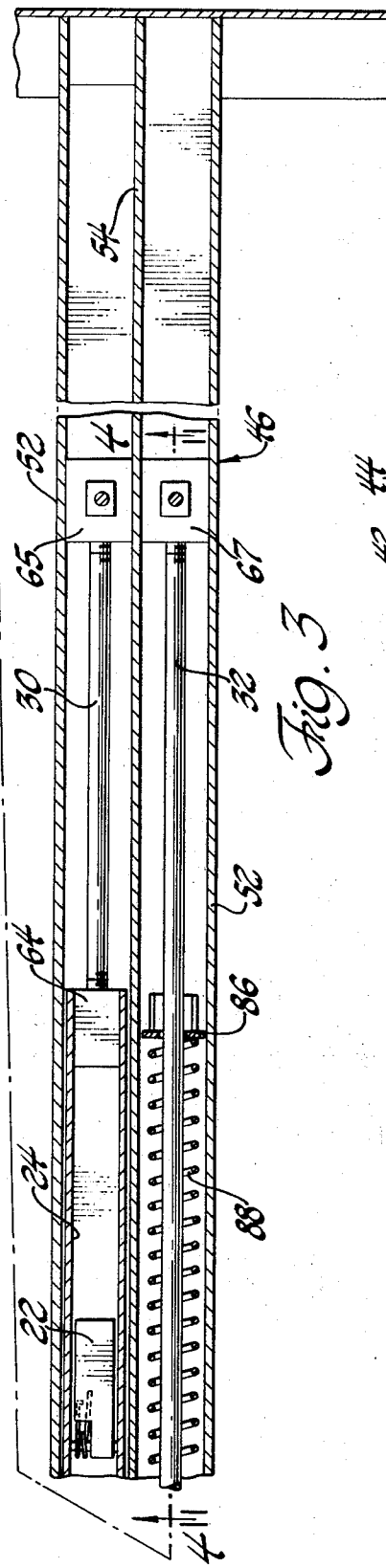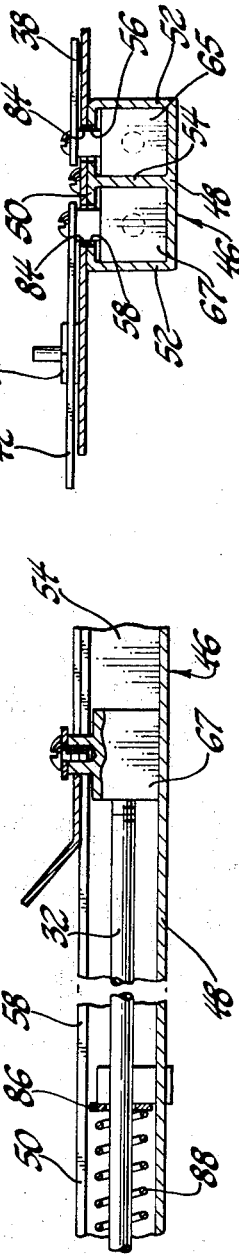

3,824,847

AUTOMOTIVE BRAKE TESTER ASSEMBLY

This invention relates to an automotive brake tester assembly.

In numerous jurisdictions automobiles must pass safety tests before they are allowed on the highways of the jurisdiction. During such tests the brakes of an automobile are checked by depressing the brake pedal. Two basic tests may be utilized in checking the brakes of an automobile. One test is to check the brake pedal travel, i.e., the distance the brake pedal moves in applying the brakes. The other test is to check brake pedal reserve.

Checking brake pedal travel is accomplished by depressing the brake pedal from its normal non-use position until a force of approximately 45 pounds is applied to the brake pedal. In the case of power brakes, the pedal travel should not exceed 1¾ inches. In the case of standard brakes, the brake pedal travel should not exceed 2½ inches. If the brake pedal travel exceeds either of these amounts, an automobile will exceed recommended standards which may indicate a faulty brake system.

The brake pedal reserve is checked once the brake pedal has been depressed to the completely bottomed or stopped position. Once the brake pedal is in this position, the space between the brake pedal and the floor board should not exceed two-fifths of the distance between the floor board and the brake pedal when the brake pedal is in the non-use position.

There are prior art assemblies which may be utilized to measure brake pedal travel and the pressure applied to the brake pedal, examples of such assemblies being shown in U.S. Pat. Nos. 1,833,154 and 1,901,292. There is not available, however, an assembly which can simultaneously perform both of these tests.

Accordingly, it is an object and feature of this invention to provide an automotive brake tester assembly including contact means for engaging and moving a brake pedal and for engaging a support structure fixed relative to the brake pedal with first indicator means for indicating the brake pedal travel and second indicator means for indicating a ratio obtained from the distance of the brake pedal travel and the distance from the brake pedal in the non-depressed position to the point of engagement of the contact means with the support structure.

In correlation with the foregoing object and feature, it is another object and feature of this invention to provide such an assembly which includes force applying means for applying a force to a brake pedal and third indicator means for indicating when a predetermined force is being applied to a brake pedal through a force applying means.

Other objects and attendant advantages of the present invention will be readily appreciated as the same becomes better understood by reference to the following detailed description when considered in connection with the accompanying drawings wherein:

FIG. 1 is a plan view of a preferred embodiment of the instant invention;

FIG. 2 is a cross sectional view taken substantially along line 2—2 of FIG. 1;

FIG. 3 is a cross sectional view taken substantially along line 3—3 of FIG. 2;

FIG. 4 is a fragmentary cross sectional view taken substantially along line 4—4 of FIG. 3; and FIG. 5 is a cross sectional view taken substantially along line 5—5 of FIG. 1.

An automotive brake tester assembly constructed in accordance with the instant invention is generally shown at 10.

The assembly 10 includes contact means generally shown at 12 for engaging and moving a brake pedal (as shown in phantom at 14) and for engaging the floor board of the automobile adjacent the brake pedal. Also included is a first indicator means generally shown at 16 for indicating the brake pedal travel or the distance the brake pedal travels from the non-use position to the fully applied position. The assembly 10 also includes second indicator means generally shown at 18 for indicating a ratio which is obtained from the distance the brake pedal travels and the distance from the brake pedal in the non-depressed position to the point of engagement of the contact means 12 with the floor board. As mentioned hereinbefore, the pedal travel for a standard brake system should not exceed 2½ inches whereas the brake pedal travel for power brakes should not exceed 1¾ inches. Also, once the pedal has been fully depressed, the distance between the brake pedal and the floor board should not exceed two-fifths of the distance between the floor board and the brake pedal when the brake pedal is in the non-use or non-depressed position. Thus, the indicator means 16 makes sure that the brake pedal travel does not exceed these limits and the indicator means 18 makes sure that the above ratio is not exceeded.

The assembly also includes force applying means comprising the foot pedal 20 for applying a force to the brake pedal 14 through the contact means 12. Also included is a third indicator means comprising the flag 22 for indicating when a predetermined force is being applied to the brake pedal by the foot pedal 20, that predetermined force should be 45 pounds plus or minus 2 pounds.

The contact means includes a pedal contact member 24 having a step 26 attached thereto for engaging a brake pedal 14. The contact means 12 also includes a floor board contact member 28 for engaging the floor board of an automotive vehicle.

A first motion transmitting means comprising a first rod 30 operatively interconnects the pedal contact member 24 and the first indicator means 16. A second motion transmitting means comprising a second rod 32 operatively interconnects the floor board contact member 28 and the second indicator means 18.

The first indicator means 16 includes a first scale defined by the indicia 34 disposed on a plate 36 and a first indicator or pointer 38 which is movable along the scale or indicia 34. The second indicator means 18 includes a second scale comprising the indicia 40 disposed on the plate 36 and a second indicator movable along the second scale, the second indicator comprising a guide 42 with a pointer 44 movable along the guide 42.

The assembly also includes a housing generally indicated at 46. The housing 46 is rectangular in cross section with front and rear faces 48 and 50 interconnected by sides 52. The housing 46 includes a center wall 54 interconnecting the front and rear faces 48 and 50 to divide the housing into first and second compartments. A first slot 56 extends along the front face 50 to provide an access to the first compartment and a second slot 58 extends along the front face 50 to provide access to the second compartment.

The pedal contact member 24 is slidably supported by and extends from the housing 46. The pedal contact member 24 comprises a four-sided hollow member slidably disposed in the first compartment.

The floor board contact member 28 is also slidably supported by and extends from the housing 46. The floor board contact member is also a four-sided hollow member and is slidably disposed in the second compartment of the housing 46.

The pedal contact member 24 has a first metal plug 60-secured in the distal end thereof by a pin 61, the pin 61 also securing the member 26 to the distal end of the pedal contact member 24. A second plastic plug 62 is disposed in the distal of the floor board contact member 28.

A first threaded plug 64 is disposed in the inward end of the pedal contact member 24 as by being welded, braised, or secured in any other appropriate fashion. The first rod 30 threadedly engages the threaded plug 64 at a first end and extends along the first compartment of the housing to a second end on which is disposed the member 65 to which is attached the indicator or pointer 38. In a similar manner a second threaded plug 66 is disposed in the inward end of the floor board contact member 28. The second rod 32 threadedly engages the second threaded plug 66 at a first end thereof and extends along the second compartment of the housing to a second end on which is disposed the member 67 to which is attached the guide 42. Thus, the first motion transmitting means comprises the rod 30 which interconnects the pedal contact member 24 and the first indicator 38 so that the first indicator 38 moves relative to the housing 46 as the pedal contact member 24 moves relative to the housing 46, the first scale being disposed on the plate 36 which is in turn secured to the housing. Similarly, the second motion transmitting means comprising rod 32 interconnects the floor board contact member 28 and the guide 42 of the second indicator so that the second indicator or guide 42 moves relative to the housing 46 as the floor board contact member 28 moves relative to the housing 46, the second scale or indicia 40 being disposed on the plate 36 which is in turn secured to the housing 46.

The force applying means or foot pedal 20 is connected to a pin 68 whereby the foot pedal 20 may pivot about the axis of the pin 68. The pin 68 is disposed in the slot 56 but is immovable therealong because it extends through a hole 69 in the rear face 48 of the housing 46.

The assembly also includes a biasing means comprising the spring 70 reacting between the housing 46 and the pedal contact member 24 for biasing the pedal contact member 24 out of the housing 46. More specifically, a reaction member 72 is disposed within the pedal contact member 24 and saddles the pin 68 and the spring 70 reacts between the reaction member 72 and the first plug 60. The pedal contact member 24 has a pair of elongated slots 74 therein which extend about the pin 68 to allow relative movement between the housing 46 and the pedal contact member 24.

The third indicator means comprising the flag 22 is operatively connected through the pedal contact member 24 by being disposed within the pedal contact member 24 on a shaft 76 and is urged outwardly toward the phantom position illustrated in FIG. 2 by a spring 78 to indicate when a predetermined force is applied and there is an equal and opposite force applied by the spring 70. More specifically, the housing 46 has an enlarged opening 80 therein along the first slot 56. The pedal contact member 24 also has an opening 82 therein and the spring 78 biases the flag 22 through the opening 82 in the pedal contact member 24 and into engagement with the housing 46 and, when in the proper position, out through the enlarged opening 80 as the spring 70 reacts between the housing 46 and the pedal contact member 24 has been depressed a predetermined amount thereby indicating that the predetermined force is being applied to the brake pedal. In other words, as force is applied to the foot pedal 20, the brake pedal 14 is depressed, and once depressed, the housing 46 moves downwardly over the pedal contact member 24 compressing the spring 70 and when the spring 70 has been compressed so that it reacts with the force of approximately 45 pounds, the flag 22 will be aligned with the opening 80 and will move to the position indicated in phantom in FIG. 2 thereby indicating that a force of approximately 45 pounds is being applied to the brake pedal 14.

The plate 36 has a pair of slots 84 therein which are co-extensive with the first and second slots 56 and 58 in the housing. The indicator or pointer 38 is connected to the member 65 on the second end of the rod 30 through one of the slots 84 in the plate 36 and through the first slot 56 in the housing 46. In a similar fashion, the guide 42 is connected to the member 67 at the second end of the rod 32 through the other slot 84 and through the second slot 58 in the housing.

The first scale formed by the indicia 34 relates to brake pedal movement for standard brakes and power brakes. The second scale including the indicia 40 shows whether the above mentioned ratio is within the proper limits.

A stop 86 is disposed in the second compartment and a second spring 88 reacts between the housing 46, through the stop 86, and the inward end of the floor board contact member 28 for urging the latter out of the housing 46.

In operation, the assembly is placed in position so that the pedal contact member 24 engages a brake pedal 14 through the member 26 as illustrated in FIG. 1. When the assembly is first placed in this initial position, the floor board contact member 28 will normally be pushed into the housing 46, thus moving the guide 42 to the right along the slot 58 as viewed in FIG. 1. In this initial position, the guide 42 crosses the left-most slanting indicia line 40, and the indicator 44 is moved along the guide 42 so that it is at the point where the left-most indicia line 40 crosses or intersects the guide 42. In this initial position, the plug 62 in the end of the floor board contact member 28 will engage the floor board. A pressure or force is applied to the assembly by an individual placing his foot on the foot pedal 20 and pushing downward. During this movement the brake pedal 14 will be depressed applying the brakes and when in this position, the housing 26 will move downwardly or telescope over the members 28 and 24 depressing the spring 70 until the flag 22 is aligned with the enlarged opening 80, thus indicating that a force of approximately 45 pounds is being applied to the brake pedal 14. Once the brake pedal is being depressed with a force of 45 pounds, the indicator 38 is moved to the right along the slot 56 and if it moves into the indicia area 34 for either the power or standard brakes, depending upon which are being tested, the brake pedal travel exceeds safe limits. Also, the indicator 44 has moved to the right to a position between the indicia lines 40 if the brake pedal reserve is within safe limits. If the indicator 44 moves to the right past the rightmost indicator or indicia line 40, the brake pedal does not have sufficint reserve. Said another way, if the indicator 44 is disposed between the indicia lines 40 when 45 pounds is being applied to the brake pedal 14, the ratio of the distance between the pedal and the floor board in the depressed position does not exceed two-fifths of the distance between the floor board and the pedal when the brake pedal is in the non-use position. Once the test is completed, the force being applied to the foot pedal 20 is relaxed and the assembly returns to the initial position.

The invention has been described in an illustrative manner, and it is to be understood that the terminology which has been used is intended to be in the nature of words of description rather than of limitation.

Obviously, many modifications and variations of the present invention are possible in light of the above teachings.

The embodiments of the invention in which an exclusive property or privilege is claimed or defined as follows:

1. An automotive brake tester assembly comprising: contact means for engaging a brake pedal and for engaging the floor board adjacent the brake pedal when said assembly is so disposed and for moving the brake pedal when actuated, first indicator means operatively connected to said contact means for indicating brake pedal travel, and second indicator means operatively connected to said contact means for indicating a ratio obtained from the distance the brake pedal is moved by said contact means and the distance from the initial engagement with the brake pedal in the nondepressed position by said contact means to the point of engagement of the contact means with the floor board.

2. An assembly as set forth in claim 1 including force applying means for transmitting a force to a brake pedal.

3. An assembly as set forth in claim 2 including third indicator means operatively connected to said contact means for indicating when a predetermined force is being applied to the brake pedal by said force applying means.

4. An assembly as set forth in claim 3 wherein said contact means includes a pedal contact member for engaging a brake pedal and a floor board contact member for engaging the floor board of an automotive vehicle.

5. An assembly as set forth in claim 4 including first motion transmitting means operatively interconnecting said pedal contact member and said first indicator means.

6. An assembly as set forth in claim 5 including second motion transmitting means operatively interconnecting said floor board contact member and said second indicator means.

7. An assembly as set forth in claim 6 wherein said first indicator means includes a first scale and a first indicator movable along said first scale.

8. An assembly as set forth in claim 6 wherein said second indicator means includes a second scale and a second indicator movable along said second scale.

9. An assembly as set forth in claim 8 including a housing, said pedal contact member being slidably supported by and extending from said housing.

10. An assembly as set forth in claim 9 wherein said floor board contact member is slidably supported by and extends from said housing.

11. An assembly as set forth in claim 10 wherein said first motion transmitting means interconnects said pedal contact member and said first indicator so that said first indicator moves relative to said housing as said pedal contact member moves relative to said housing, said first scale being disposed on said housing.

12. An assembly as set forth in claim 11 wherein said second motion transmitting means interconnects said floor board contact member and said second indicator so that said second indicator moves relative to said housing as said floor board contact member moves relative to said housing, said second scale being disposed on said housing.

13. An assembly as set forth in claim 12 wherein said force applying means is connected to said housing and including biasing means reacting between said housing and said pedal contact member for biasing the latter out of said housing.

14. An assembly as set forth in claim 13 wherein said third indicator means is operatively connected to said pedal contact member and indicates when said predetermined force is applied and there is an equal and opposite force supplied by said biasing means.

15. An assembly as set forth in claim 14 wherein said second indicator comprises a guide connected to said second motion transmitting means and a pointer movable therealong.

16. An assembly as set forth in claim 15 wherein said first scale includes indicia relating to brake pedal movement for each of standard brakes and power brakes.

17. An assembly as set forth in claim 16 wherein said second scale includes indicia showing whether said ratio is within the proper limits.

18. An assembly as set forth in claim 17 wherein said biasing means includes at least one spring.

19. An assembly as set forth in claim 18 including a second spring reacting between said housing and said floor board contact member for urging the latter out of said housing.

20. An assembly as set forth in claim 19 wherein said housing is rectangular in cross section with front and rear faces interconnected by sides and including a center wall interconnecting said faces to divide said housing into first and second compartments, a first slot extending along said front face to provide access to said first compartment, a second slot extending along said front face to provide access to said second compartment, said pedal contact member comprising a four-sided hollow member slidably disposed in said first compartment, said floor board contact member comprising a four-sided hollow member slidably disposed in said second compartment, said pedal contact member having a first plug in the distal end thereof, said floor board contact member having a second plug in the distal end thereof, said force applying member comprising a foot pedal, a pin extending through said rear face of said housing and through said first slot and connected to said foot pedal, a reaction member disposed within said pedal contact member, said spring reacting between said reaction member and said first plug, said pedal contact member having slots therein through which said pin extends to allow movement of said pedal contact member relative to said housing, said housing having an enlarged opening along said first slot, said third indicator means including a flag movably connected to said pedal contact member, said pedal contact member having an opening therein, spring means biasing said flag through said opening in said pedal contact member and into engagement with said housing and out through said enlarged opening therein when said spring reacting between said housing and said pedal contact member is compressed a predetermined amount thereby indicating said pre-determined force is being applied to the brake pedal, a first threaded plug disposed in the inward end of said pedal contact member, said first motion transmitting means including a first rod threadedly engaging said threaded plug at a first end and extending along said housing to a second end, a second threaded plug disposed in the inward end of said floor board contact member, said second motion transmitting means including a second rod threadedly engaging said second threaded plug at a first end and extending along said housing to a second end, said scales being disposed on a plate which is connected to said housing, said plate having a pair of slots therein coextensive with said first and second slots in said housing, said first indicator being connected to said second end of said first rod through one of said slots in said plate and through said first slot in said housing, said guide being connected to said second end of said second rod through the other slot in said plate and through said second slot in said housing, a stop disposed in said second compartment, said second spring disposed in said second compartment about said second rod and reacting between said stop and said inward end of said floor board contact member.

* * * * *